US010094360B2

(12) United States Patent
Arlaban Gabeiras et al.

(10) Patent No.: US 10,094,360 B2
(45) Date of Patent: Oct. 9, 2018

(54) CONTROL METHOD FOR A WIND TURBINE (71) Applicant: Acciona Windpower, S.A., Navarra (ES)

(72) Inventors: Teresa Arlaban Gabeiras, Navarra (ES); Diego Otamendi Claramunt, Navarra (ES); Jose Miguel Garcia Sayes, Navarra (ES); Alfonso Ruiz Aldama, Navarra (ES); Alberto Garcia Barace, Navarra (ES); Oscar Luquin Hermoso de Mendoza, Navarra (ES); Alejandro Gonzalez Murua, Navarra (ES); Miguel Nunez Polo, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 0 days.

(21) Appl. No.: 14/850,227

(22) Filed: Sep. 10, 2015

(65) Prior Publication Data
US 2016/0069323 A1 Mar. 10, 2016

(30) Foreign Application Priority Data

Sep. 10, 2014 (ES) .................................. 201431304

(51) Int. Cl.
G05B 13/02 (2006.01)
F03D 7/04 (2006.01)
F03D 7/02 (2006.01)

(52) U.S. Cl.
CPC ............ F03D 7/047 (2013.01); F03D 7/0276 (2013.01); F03D 7/048 (2013.01); F05B 2270/32 (2013.01);
(Continued)

(58) Field of Classification Search
CPC ... Y02E 10/723; Y02E 10/721; F03D 7/0224; F03D 7/0276; F03D 7/046; F03D 7/042;
(Continued)

(56) References Cited

U.S. PATENT DOCUMENTS 6,320,272 B1 * 11/2001 Lading .................. F03D 7/0224
290/44
7,352,076 B1 * 4/2008 Gabrys .................. F03D 3/005
290/44
(Continued)

FOREIGN PATENT DOCUMENTS

CA 1245283 11/1988
CN 103147918 A 6/2013
(Continued)

OTHER PUBLICATIONS

Munteanu; "Wind turbulence used as searching signal for MPPT in variable-speed wind energy conversion systems"; Renewable Energy; 2009; pp. 322-327; vol. 34; Elsevier.

Primary Examiner — Darrin D Dunn
(74) Attorney, Agent, or Firm — Hayes Soloway PC (57) ABSTRACT The present invention relates to a control method for a wind turbine whereby it is possible to detect situations in which the machine is not working at its maximum performance point, wherein in addition, once these situations have been detected, the control method of the present invention allows to perform an automatic correction of the control parameters and to return the turbine to its optimum operating point.

29 Claims, 7 Drawing Sheets (52) U.S. Cl.
CPC ....... *F05B 2270/327* (2013.01); *Y02E 10/723* (2013.01)

(58) Field of Classification Search
CPC ... F03D 7/048; F03D 7/02; F03D 7/04; F03D 7/045; F05B 2270/20; F05B 2270/32; F05B 2270/101
See application file for complete search history.

(56) References Cited

U.S. PATENT DOCUMENTS

| | | | | |
|---|---|---|---|---|
| 2004/0041405 | A1* | 3/2004 | Seki | F03D 7/0272 290/54 |
| 2005/0240289 | A1* | 10/2005 | Hoyte | G05B 23/0294 700/49 |
| 2007/0035280 | A1* | 2/2007 | Fujiyama | H03K 17/22 323/212 |
| 2008/0140263 | A1* | 6/2008 | Wang | F03D 7/028 700/291 |
| 2009/0220340 | A1* | 9/2009 | Pierce | F03D 7/0224 416/36 |
| 2009/0295159 | A1* | 12/2009 | Johnson | F03D 7/0224 290/44 |
| 2010/0023084 | A1* | 1/2010 | Gunderson | A61N 1/3706 607/28 |
| 2010/0133817 | A1 | 6/2010 | Kinzie et al. | |
| 2010/0133829 | A1* | 6/2010 | Bertenyi | F03D 3/065 290/44 |
| 2011/0309621 | A1* | 12/2011 | Nielsen | F03D 7/0224 290/44 |
| 2012/0027587 | A1* | 2/2012 | Lee | F03D 7/0224 416/1 |
| 2012/0086474 | A1* | 4/2012 | Idiart | H03M 1/1071 327/70 |
| 2012/0098265 | A1* | 4/2012 | Skaare | F03D 7/0272 290/53 |
| 2013/0166082 | A1* | 6/2013 | Ambekar | G05B 13/04 700/287 |
| 2013/0252271 | A1* | 9/2013 | Ullery | C12Q 1/04 435/29 |
| 2014/0117667 | A1* | 5/2014 | Holstein | F03B 11/04 290/43 |
| 2014/0193254 | A1* | 7/2014 | Gopolan | F03D 7/022 416/1 |
| 2014/0241878 | A1* | 8/2014 | Herrig | F03D 7/0224 416/1 |
| 2014/0327243 | A1* | 11/2014 | Demtroder | F03D 7/0276 290/44 |
| 2015/0252786 | A1* | 9/2015 | Tiwari | F03D 7/04 416/1 |
| 2015/0308416 | A1* | 10/2015 | Ambekar | F03D 17/00 700/287 |
| 2015/0345476 | A1* | 12/2015 | Gregg | F03D 11/0091 702/92 |
| 2015/0354535 | A1* | 12/2015 | Pineda Amo | F03D 7/0224 416/1 |
| 2016/0099566 | A1* | 4/2016 | Murphy | H02J 3/50 700/298 |

FOREIGN PATENT DOCUMENTS

| | | | |
|---|---|---|---|
| CN | 103244350 A | 8/2013 | |
| EP | 2634420 A1 | 9/2013 | |
| EP | 2757007 A1 * | 7/2014 | .......... B60T 8/17552 |
| EP | 2757252 A1 | 7/2014 | |
| WO | 2008/119994 A2 | 10/2008 | |

* cited by examiner

Y : Yaw orientation system activation signal
$\varphi_{ref}$ : Wind direction reference
$\varphi_{med}$ : Anemo-measured wind direction
$\varphi_{offset}$ : Orientation offset
$\varphi$ : Nacelle orientation

CONTROL METHOD FOR A WIND TURBINE

OBJECT OF THE INVENTION

The present invention relates to a control method for a wind turbine to detect situations in which the machine is not working at its point of maximum performance.

Also, once detected these situations, the control method of the present invention allows to perform an automatic correction of the control parameters and to return the turbine to its optimum operating point.

BACKGROUND OF THE INVENTION

Today it is common to use renewable energy for power generation, including wind energy as one of the most efficient. Wind energy can generate electricity from wind by means of wind turbines. Said wind turbines basically consist of a tower, a nacelle that houses the electrical generator, a rotor formed in turn by at least two blades, and a power train that transmits power from the rotor to the electric generator. The power train may comprise a gear box with a low speed shaft connected to the rotor and a high speed shaft connected to the electric generator.

In multi-megawatt wind turbines, there is a trend towards larger rotors, which provide energy at a lower cost. In these configurations, there is a growing importance of the control system. This system maximizes energy production while limiting the mechanical loads produced by the wind. For this, the control system acts on the blade pitch angle and the torque required from the generator.

Firstly, the pitch angle is controlled by actuators arranged in the root of each blade, making the blade rotate around its longitudinal axis. Such actuation varies the aerodynamic performance of the blade, while on the other hand, the control system modulates the torque required to the generator from the converter.

The energy production of a wind turbine under different wind conditions begins above a certain wind speed commonly known as Vcut-in, so that with higher winds the turbine starts to rotate producing energy, and with lower winds the turbine remains paused with a safety pitch angle of 90°, which causes the rotational speed of the rotor to be substantially zero. There is also a wind speed for which the wind turbine reaches the rated power Vrated.

The graph of the required electric torque T vs the rotational speed of the electric generator $\omega$, shows a variable speed section in which a control system of the prior art determines the required electric torque T as a function of the generator rotational speed $\omega$, in order to maintain the blade tip speed ratio (Tip speed ratio or $\lambda$) constant at an optimum which maximizes the capture of aerodynamic wind power. $\lambda=(\omega \times R)/v$, wherein
$\omega$: Rotor rotational speed
R: radius of the rotor
v: incident wind speed To perform the above control to keep the tip speed ratio constant to an optimal value that maximizes the capture of aerodynamic wind power, there are prior patents that propose a closed loop control of $\lambda$ acting on the torque of the generator.

It is the case of the international patent application WO2008119994A2, which describes a controller that modifies the rotational speed of the rotor by acting on the electrical torque depending on the local wind speed measured to maintain the tip speed ratio within predetermined limits. If for instance the maximum energy efficiency is given for a $\lambda=3.5$, the controller is programmed to maintain the tip speed ratio between 3.5 and 4.5 (default or optimum value). An anemometer measures instantaneous wind speed at the frequency of 2 to 4 Hz and this is sent to the controller, which calculates the instant $\lambda$ respect to the default or optimum value.

However, it is not ideal to use directly a measure of $\lambda$, as it requires a measure of the wind speed with an anemometer placed in the nacelle, which is a very noisy signal and sensitive to environmental effects such as wind shear, up flow, etc. In addition, the usual location of the anemometer at the rear of the nacelle means that its measurement is disturbed by the rotor.

To avoid this drawback, it is usual to perform a control of the rotational speed of the wind turbine by acting on the electrical torque so that the wind turbine operates in the variable speed area according to the T/$\omega$ ratio established.

Due to various turbine or environmental related effects, the machine can go to work in non-optimal conditions, either from the point of view of energy production or the structural integrity of the machine, so that the power generated by the wind turbine for a given wind speed is less than that which would ideally be produced with the same wind speed.

The effects related to the wind turbine include:
  Misalignment with respect to the wind direction. This may be due to assembly errors of the direction sensor (vane), wind flow distortion in the vane caused by the rotor, etc. . . . .
  Dirt, ice or blade deterioration. It reduces the efficiency of the turbine.
  Component degradation. This decreases component performance affecting the overall efficiency of the machine.

The effects related to the environment of the machine that affect its performance include:
  Variations in density.
  Up flow.
  Shear profile.

In the prior art, the control parameters of the control system of wind turbines are calculated theoretically or with the help of simulation tools. In addition, methods for the detection of anomalous conditions are based on the comparison of the generated power with a given wind and the theoretical power that should be generated with that wind. These methods have the disadvantage that, for comparisons to be valid, only data corresponding to wind speeds included in relatively small wind intervals (0.5 m/s–1 m/s) may be considered.

Both in the case of the international application WO2008119994A2 and in the patent with publication number CA1245283A1, which describes a wind energy conversion system with a closed loop control system based on an error signal which is a measurement of the difference between a desired value or reference value of the tip speed ratio ($\lambda$opt) and $\lambda$ associated with when the wind turbine receives a gust of wind, when the rotational speed is changed based on the comparison of instantaneous values of the tip speed ratio with the optimum tip speed ratio, these controls assume that the instantaneous differences in $\lambda$ are due to the fact that the wind speed has changed, for example due to a gust of wind, so it is necessary to change the rotational speed to be in the optimal area. However, as explained, there are environmental conditions or of the turbine itself that make it operate outside its point of maximum performance, which are not corrected by changing the rotational speed of the rotor.

The present invention relates to a control method for detecting situations in which the machine is not working at its optimum operating point overcoming the disadvantages of the aforementioned prior art cases.

Also, once these situations have been detected, the control method of the present invention allows to perform an automatic correction of the control parameters and return the wind turbine to its optimum operating point.

DESCRIPTION OF THE INVENTION

The present invention relates to a control method for a wind turbine wherein the wind turbine comprises:
A control system,
A rotor with at least one blade,
A nacelle, and
wherein the control system is configured to regulate the rotational speed of the rotor ($\omega$) within an area of variable speed between a minimum value ($\omega_{min}$) and a maximum value ($\omega_{max}$) of rotor rotation speed ($\omega$) so that the tip speed ratio, $\lambda$, is maintained substantially equal to a target value ($\lambda_{opt}$) of the tip speed ratio, and
wherein the method comprises:
A step of calculating the mean value ($\lambda_{med}$) of a parameter indicative of the tip speed ratio, $\lambda$, in the variable speed area, from a signal of the rotational speed of the rotor $\omega$ and a wind speed signal, v,
A step of comparing the mean value ($\lambda_{med}$) of the parameter indicative of the tip speed ratio in the variable speed area with the target value ($\lambda_{opt}$) of the parameter indicative of the tip speed ratio, and
A step of modifying at least one parameter of the control system according to the result of the comparison step between the mean value ($\lambda_{med}$) of the parameter indicative of the tip speed ratio in the variable speed area and the target value ($\lambda_{opt}$) of the parameter indicative of the tip speed ratio.

The mean value ($\lambda_{med}$) of the parameter indicative of the tip speed ratio, $\lambda$, in the variable speed area can be calculated based on instantaneous values of the parameter indicative of the tip speed ratio, $\lambda$, calculated from the signal of the rotational speed of the rotor $\omega$ and the signal of wind speed, v, or from average values, for example minutes or ten-minute values, of rotational speed of the rotor $\omega$ and wind speed, v.

In this way, and by the step of comparing the mean value ($\lambda_{med}$) of a parameter indicative of the speed tip ratio in the variable speed area with the target value ($\lambda_{opt}$), it is determined whether or not the wind turbine is working at its point of maximum performance, this step not being associated with an instantaneous gust of wind, as in the prior art, yet rather with the fact that the wind turbine is not working steadily at its optimum operating point, later modifying at least one control system parameter based on the result of the comparison step.

Optionally, the step of comparing the mean value ($\lambda_{med}$) of the parameter indicative of the tip speed ratio in the variable speed area with the target value ($\lambda_{opt}$) of the parameter indicative of the tip speed ratio comprises a sub step of calculating a difference between the mean value ($\lambda_{med}$) of the parameter indicative of tip speed ratio in the variable speed area and the target value ($\lambda_{opt}$) of the parameter indicative of tip speed ratio, and wherein the step of modifying at least one parameter of the control system is carried out if the value of the difference calculated between the mean value ($\lambda_{med}$) of the parameter indicative of the tip speed ratio in the variable speed area and the target value ($\lambda_{opt}$) of the parameter indicative of the tip speed ratio, is above a first threshold value, since due to the uncertainty of measurement it is advisable to have a dead band of dispersion of the mean value ($\lambda_{med}$) of the parameter indicative of the tip speed ratio in the variable speed area in which no control parameter is modified.

Optionally the control method of the present invention comprises a step of filtering values of the parameter indicative of the tip speed ratio, $\lambda$, prior to the step of calculating the mean value ($\lambda_{med}$) of the parameter indicative of the tip speed ratio in the variable speed area.

Therefore, in the steps described above, the control method detects that there is at least one inappropriate control parameter for the existing environmental or machine conditions.

Optionally, the step of modifying at least one parameter of the control system further comprises a sub step of identifying at least one control parameter to be modified, wherein the inappropriate parameter is identified This sub step of identifying at least one control parameter to be modified in turn comprises a sub step of comparing at least one operational parameter of the wind turbine related to at least one control parameter, with the same operational parameter of at least one adjacent wind turbine.

The value of the control parameter is not suitable because it has a different value from that which would provide greater power generation or lower loads. That is why at least one operational parameter related to the control parameter of a wind turbine is compared with the equivalent operational parameter of an adjacent wind turbine.

Most likely, control parameters capable of being improved are:
the ratio ($K_{opt}$) between the torque required to the wind turbine (T) and the square of the rotational speed of the wind turbine ($\omega^2$) in the variable speed area, and
the ratio between the pitch angle and the generated electric power,
offset of nacelle orientation,
by ceasing to be appropriate and therefore needed to be modified as a result of variations in density, dirt or deterioration of the blades, etc.

As an alternative to the identification sub step, it may be established that a predetermined control parameter is modified, which can be among others the ratio ($K_{opt}$) between the torque required to the wind turbine (T) and the square of the rotational speed of the wind turbine ($\omega^2$) in the variable speed area or even a predetermined sequenced modification of control parameters: for example, first, the ratio ($K_{opt}$) between the torque required to the wind turbine (T) and the square of the rotational speed of the wind turbine ($\omega^2$) in the variable speed area, and then the ratio between the pitch angle and the generated electric power.

Optionally, if the control system determines that the wind turbine is not working at its optimum operating point, i.e., it is not capturing as much energy as possible for the existing environment and wind turbine conditions because a control parameter does not have a suitable value, optionally the control method comprises a step of automatic identification of the correct value of the control parameter to be modified.

Additionally, there are environmental conditions or conditions of the turbine itself that modify the aerodynamic characteristics of the wind turbine and can change its point of maximum performance. In these conditions, the target value ($\lambda_{opt}$) of the parameter indicative of the tip speed ratio no longer corresponds to the value of the parameter indicative of the tip speed ratio that provides the highest generation of electrical energy in the variable speed area. When these conditions are detected, based on the result of the step of comparison between the mean value ($\lambda_{med}$) of the parameter indicative of the tip speed ratio in the variable speed area and the target value ($\lambda_{opt}$) of the parameter indicative of the tip speed ratio, the control method of the invention further comprises a step of modification of the target value ($\lambda_{opt}$) of the parameter indicative of the tip speed ratio.

The new value of the target value ($\lambda_{opt}$) of the parameter indicative of the tip speed ratio can be a predetermined value or a value calculated based on the result of the step of comparison between the mean value ($\lambda_{med}$) of the parameter indicative of the tip speed ratio in the variable speed area and the target value ($\lambda_{opt}$) of the parameter indicative of the tip speed ratio When the control parameter modified is the ratio ($K_{opt}$) between the torque required to the wind turbine (T) and the square of the rotational speed of the wind turbine ($\omega^2$) in the variable speed area, the range of wind speeds in which the wind turbine is operating at a rated value of the rotational speed $\omega_{rated}$ and below a rated value of the electrical power $P_{rated}$ is extended. As a consequence, in this operating area the angles of attack of the aerodynamic profiles of the blade increase, which in turn can cause stall and therefore loss of energy production and higher loads.

To prevent this situation, the control system of the of the invention, can additionally increase the ratio between the pitch angle and the electrical power generated in the area where the wind turbine is operating at $\omega_{rated}$ and below $P_{rated}$ based on the result of the step of comparison between the mean value ($\lambda_{med}$) of the parameter indicative of the tip speed ratio in the variable speed area and the target value ($\lambda_{opt}$) of the parameter indicative of the tip speed ratio.

PREFERRED EMBODIMENT OF THE INVENTION

Figure 1:
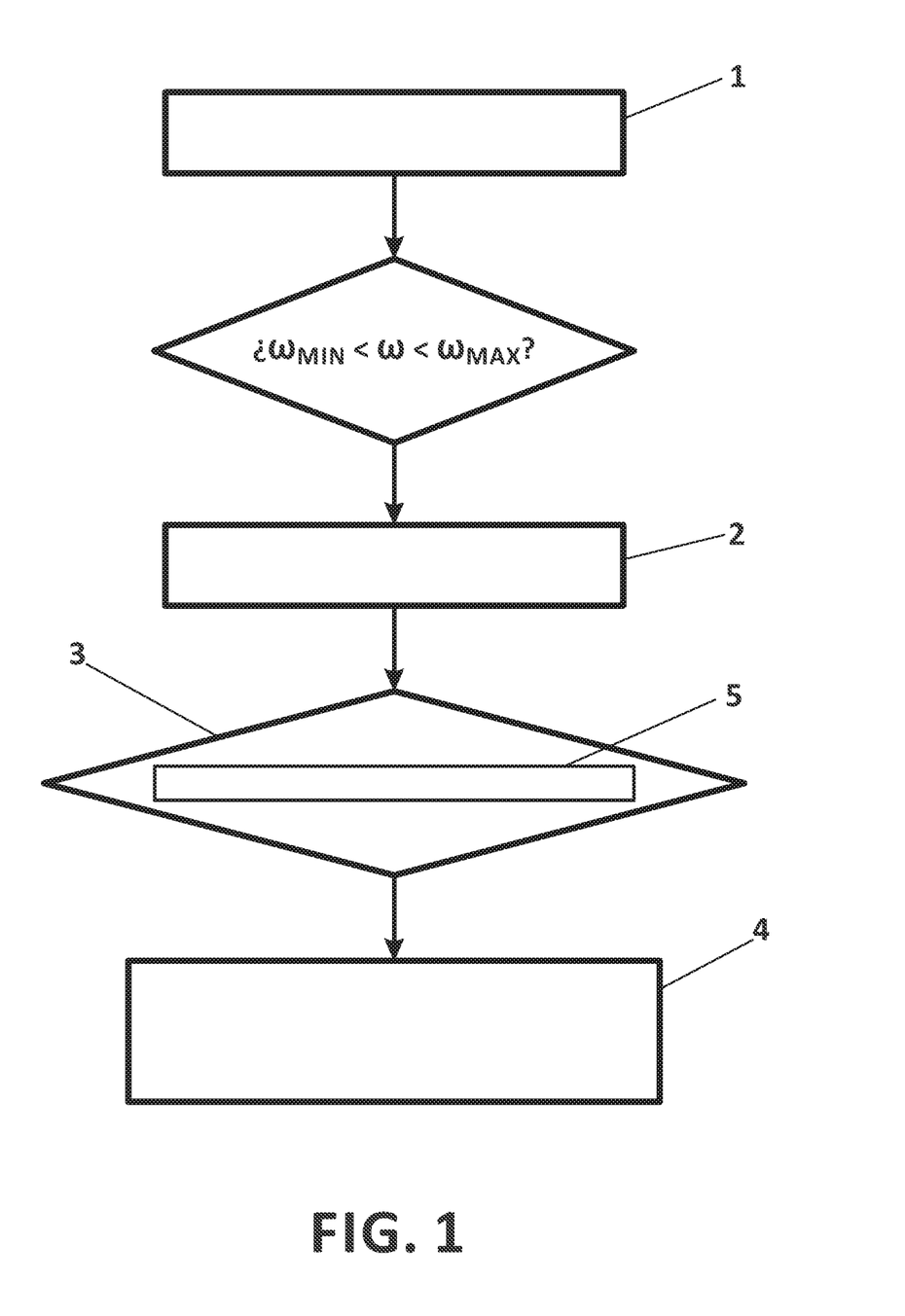
FIG. 1 shows a flowchart of the control method of a wind turbine of the present invention.

FIG. 1 shows the flowchart of the control method of the present invention. The invention relates to a control method of a wind turbine, the wind turbine comprising:
 a control system,
 a rotor with at least one blade,
 a nacelle, and
 wherein the control system is configured to regulate the rotational speed of the rotor (ω) within a variable speed area between a minimum value ($\omega_{min}$) and a maximum value ($\omega_{max}$) of rotational speed of the rotor (ω), which in this preferred embodiment shown in FIG. 2, correspond to the values 1.2$\omega_{min}$ and 0.8$\omega_{rated}$ respectively, so that a tip speed ratio, λ, is maintained substantially equal to a target value ($\lambda_{opt}$) of the tip speed ratio, wherein the method comprises:
 a step of calculating the mean value ($\lambda_{med}$) of a parameter indicative of the tip speed ratio, λ (2) in the variable speed area, based on the signal of the rotational speed of the rotor, ω, and the wind speed signal, v, which in this preferred embodiment is performed according to the formula λ=(ω×R)/v, wherein R is the radius of the rotor,
 a step of comparison (3) of the mean value ($\lambda_{med}$) of the parameter indicative of the tip speed ratio in the variable speed area and the target value ($\lambda_{opt}$) of the parameter indicative of the tip speed ratio, and
 a step of modification (4) of at least one control system parameter based on the result of the comparison step between the mean value ($\lambda_{med}$) of the parameter indicative of the tip speed ratio in the variable speed area and the target value ($\lambda_{opt}$) of the tip speed ratio.

The target value ($\lambda_{opt}$) of the parameter indicative of tip speed ratio in the variable speed area corresponds to the value of the tip speed ratio which provides greater power generation in the variable speed area.

In the variable speed area, the control system regulates the torque required to the generator (T) as a function of the generator rotational speed (ω), so that the value of λ is as close as possible to the value of $\lambda_{opt}$.

Figure 2:
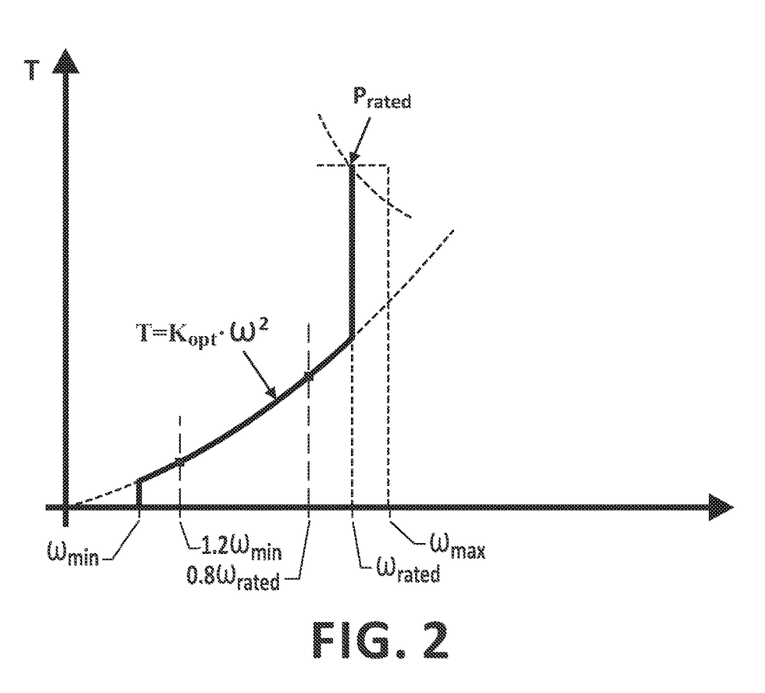
FIG. 2 shows a graph of the curve torque requested to the electrical generator of the wind turbine vs the rotational speed of the generator, wherein the range of variable speed of the wind turbine of the present invention is defined.
Figure 3:
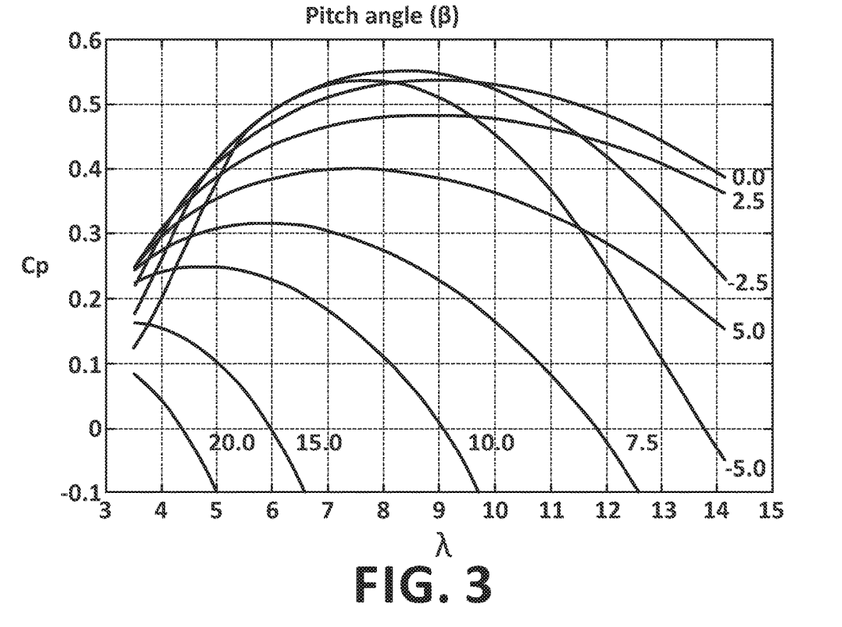
FIG. 3 shows different curves Cp/λ for different pitch angle values.

FIG. 2 shows the ratio between T/ω throughout the working area of the wind turbine; it identifies the following sections:
 a first vertical section of the curve in which the rotational speed of the generator is kept substantially constant and equal to $\omega_{min}$
 a second section wherein the rotational speed of the wind turbine varies between the values $\omega_{min}$ and $\omega_{rated}$
 a third vertical section in which the rotational speed of the generator is kept substantially constant and equal to $\omega_{rated}$ In one possible embodiment, the ratio between T and ω in the variable speed area is governed by the expression:

$$T = K_{opt} \cdot \omega^2$$

wherein, $$K_{opt} = \frac{\rho \cdot \pi \cdot R^5 \cdot Cp_{max}}{2 \cdot \lambda_{opt}^2 \cdot G^3}$$

where:
ρ: air density
R: radius of the rotor
$Cp_{max}$: maximum power coefficient
G: Ratio between rotational speeds of the generator and rotor As shown in FIG. 3, depicting different curves of power coefficient ($C_p$) of the wind turbine when the latter is perfectly oriented with respect to the direction of wind, $C_p$ depends on the tip speed ratio (λ) and blade pitch angle. The power coefficient ($C_p$) and thus the generation of electricity, reach peak value for a given value of the blade pitch angle and a given value of the tip speed ratio (λ) which in the case of $C_p$ max will be $\lambda_{opt}$. Therefore, in the variable speed area, the machine varies the rotational speed of the rotor to try to work with λ values close to the target value ($\lambda_{opt}$).

To carry out the method described, the control system keeps track of the mean value ($\lambda_{med}$) of the parameter indicative of tip speed ratio, λ, in the variable speed area in periods when the wind turbine is not working in that area. Once the wind turbine comes back to operate in the variable speed area, the registered mean value ($\lambda_{med}$) of the parameter indicative of the tip speed ratio is recovered to carry out the step of calculating the mean value (2), based on the signal of the rotational speed of the rotor, ω and the wind speed signal, v. The control system requires a minimum measurement time in the variable speed area before calculating a first value of $\lambda_{med}$ to be used in the comparison with $\lambda_{opt}$.

The step of comparison (3) between the mean value ($\lambda_{med}$) of the parameter indicative of tip speed ratio in the variable speed area and the target value ($\lambda_{opt}$) of the parameter indicative of the tip speed ratio comprises a sub step of calculation (5) of a difference between the mean value ($\lambda_{med}$) of the parameter indicative of the tip speed ratio in the variable speed area and the target value ($\lambda_{opt}$) of the parameter indicative of the tip speed ratio, and wherein the step of modifying (4) at least one parameter of the control system is performed if the value of the difference calculated between the mean value ($\lambda_{med}$) of the parameter indicative of the tip speed ratio in the variable speed area and the target value ($\lambda_{opt}$) of the parameter indicative of tip speed ratio is above a first threshold value (first threshold value with respect to the target value ($\lambda_{opt}$) of the parameter indicative of the tip speed ratio). Thus, after detecting a situation in which the machine is not working at its maximum performance point, the control method performs a modification of at least one control parameter which allows the wind turbine to return to its optimum operating point.

Figure 4:
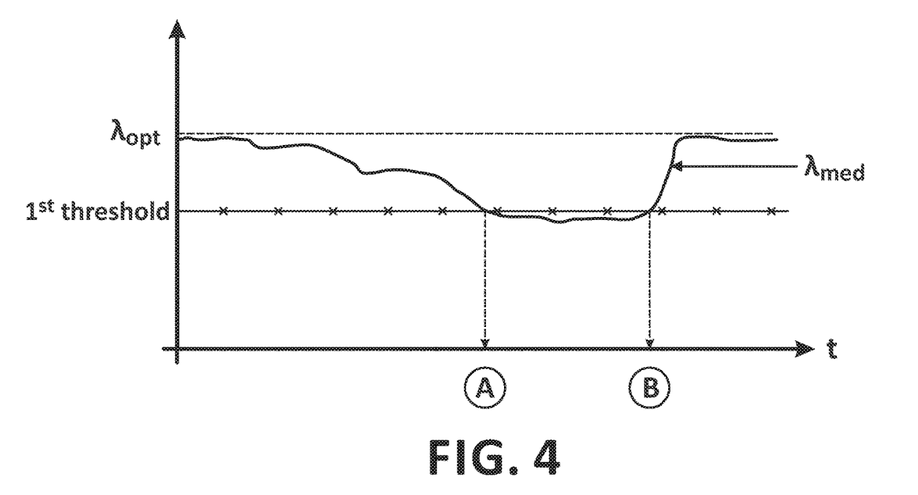
FIG. 4 shows a graph of the time evolution of the mean value ($\lambda_{med}$) of the parameter indicative of the tip speed ratio in the variable speed area in a wind turbine which implements the control method of the invention.

FIG. 4 shows the time evolution of the mean value ($\lambda_{med}$) of the parameter indicative of the tip speed ratio in the variable speed area (solid line), the target value ($\lambda_{opt}$) of the parameter indicative of the tip speed ratio (dotted line) and the first threshold value used to initiate the modification step (4) of at least one parameter of the control system. It is noted at instant A, the value of the difference calculated between the mean value ($\lambda_{med}$) of the parameter indicative of the tip speed ratio in the variable speed area and the target value ($\lambda_{opt}$) of the parameter indicative the tip speed ratio, is above a first threshold value. It is at that instant when a sub step of identification (7) starts, regarding at least one control parameter to be modified and a stage of automatic identification (10) of the correct value of said parameter to be described later on. Once the control parameter to be modified and the correct value have been identified, at the instant B modification occurs (4) of the control parameter to an appropriate value. As a result, it can be observed that as of the instant B, the mean value ($\lambda_{med}$) of the parameter indicative of the tip speed ratio in the variable speed area again approaches the target value ($\lambda_{opt}$) of the tip speed ratio.

The control method of the present invention further comprises a step of filtering (6) of the values of the parameter indicative of the tip speed ratio, λ, prior to the step of calculating the mean value ($\lambda_{med}$) of the parameter indicative of the tip speed ratio (2) in the variable speed area.

Preferably, the step of calculating the mean value ($\lambda_{med}$) of the parameter indicative of the tip speed ratio, λ, (2) in the variable speed area is done with values of the parameter indicative of the tip speed ratio of corresponding the rotational speeds of the rotor (ω) greater than 1.1 times the minimum rotational speed ($\omega_{min}$) of the variable speed area of the rotor and smaller than 0.9 times the maximum rotational speed ($\omega_{max}$) of the variable speed area of the rotor, limiting the range of data used in the step of calculating the mean value ($\lambda_{med}$) of the parameter indicative of the tip speed ratio (2) in the variable speed area.

Preferably, the control parameter to be modified in the modification step is at least one of the following:
 a ratio ($K_{opt}$) between the torque requested to the wind turbine (T) and the square of the rotational speed of the wind turbine ($\omega^2$) in the variable speed area
 an offset of nacelle orientation or
 a ratio between the pitch angle (β) and the electrical power generated (P).

A deviation of the mean value ($\lambda_{med}$) of the parameter indicative of tip speed ratio in the variable speed area with respect to the target value ($\lambda_{opt}$) of the parameter indicative of the tip speed ratio in that area of operation can occur due among other factors to a change in environmental conditions, i.e. air density or a variation in the aerodynamic characteristics of the blade and therefore of the Cp and of the electric power produced for specific environmental conditions (temperature, density and pressure).

This variation of the aerodynamic characteristics of the blade can also be a consequence of the depositing of particles on the surface of the blade, both dirt and ice or due to wear of the surface by friction. In these circumstances, the control method described establishes that it is necessary to modify at least the control parameter ($K_{opt}$) that defines the ratio between the torque required to the wind turbine (T) and the square of the rotational speed of the wind turbine ($\omega^2$) in the variable speed area, going from an initial value ($K_{opt1}$) of the ratio ($K_{opt}$) between the torque required to the turbine (T) and the square of the rotational speed of the wind turbine ($\omega^2$) that was inappropriate to a new value ($K_{opt2}$) which makes the mean value ($\lambda_{med}$) of the parameter indicative of the tip speed ratio in the variable speed area (solid line) return closer to the target value ($\lambda_{opt}$) of the parameter indicative of the tip speed ratio in that area of operation after updating the control parameter to the new set value In one embodiment, it is discarded that the difference of the mean value ($\lambda_{med}$) of the parameter indicative of the tip speed ratio in the variable speed area with respect to the target value ($\lambda_{opt}$) of the parameter indicative of the tip speed ratio in that area of operation is due to an error in the orientation of the wind turbine nacelle (due to having calibrated the vane for instance in the commissioning of the wind turbine) and it is assumed that the difference is due to a variation of Cp or environmental conditions. According to this embodiment, it is pre-established that the control parameter to be modified is at least the ratio ($K_{opt}$) between the torque required to the turbine (T) and the square of the rotational speed of the wind turbine ($\omega^2$) in the variable speed area.

Figure 5:
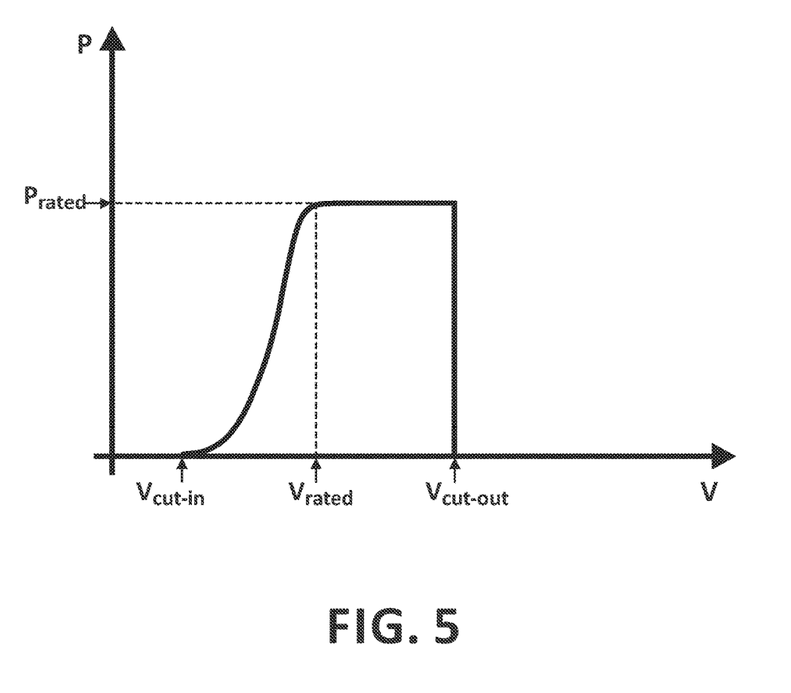
FIG. 5 shows a power curve of a wind turbine.

FIG. 5 shows the power curve of the wind turbine; two distinct areas are distinguished:
- The partial power area corresponding to wind speeds in which the power generated is below the rated power, and
- Rated power area corresponding to wind speeds in which the power generated by the wind turbine is substantially equal to the nominal power.

Figure 6:
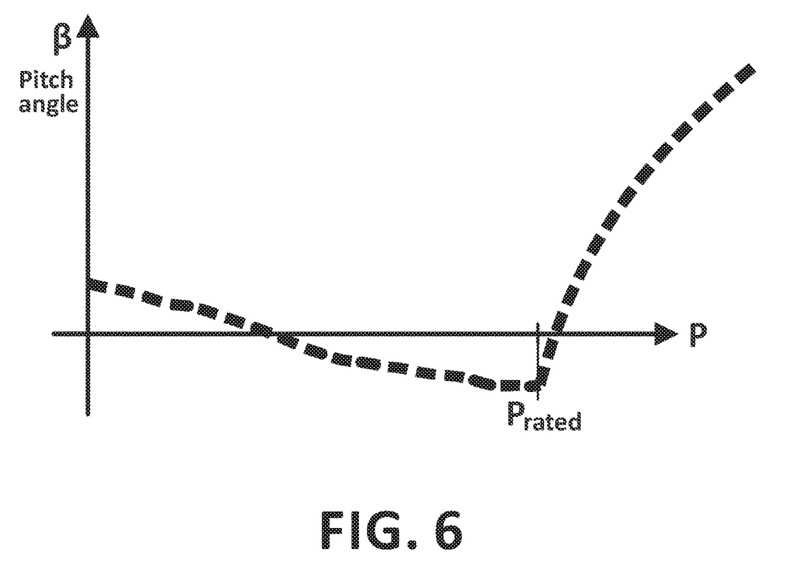
FIG. 6 shows the ratio between the blade pitch angle and the electric power generated before applying the control method of a wind turbine of the present invention.

In wind turbines of the prior art, in the partial power area, the blade pitch angle or optimal pitch angle, which is the one that provides the highest possible power generation, is calculated for each value of electrical power generated, wherein the control system measures the electrical power generated and applies the corresponding pitch angle. FIG. 6 shows the ratio between pitch angle and the electric power generated. In the area of nominal power, the control system controls the pitch angle to maintain the power generated substantially equal to the nominal power.

Optionally, when the control parameter to be modified is the ratio ($K_{opt}$) between the torque required to the turbine (T) and the square of the rotational speed of the wind turbine ($\omega^2$) in the variable speed area, the ratio between the pitch angle and electrical power generated changes proportionally to the change in the ratio ($K_{opt}$) between the torque required to the wind turbine (T) and the square of the rotational speed of the wind turbine ($\omega^2$) in the variable speed area.

Figure 7:
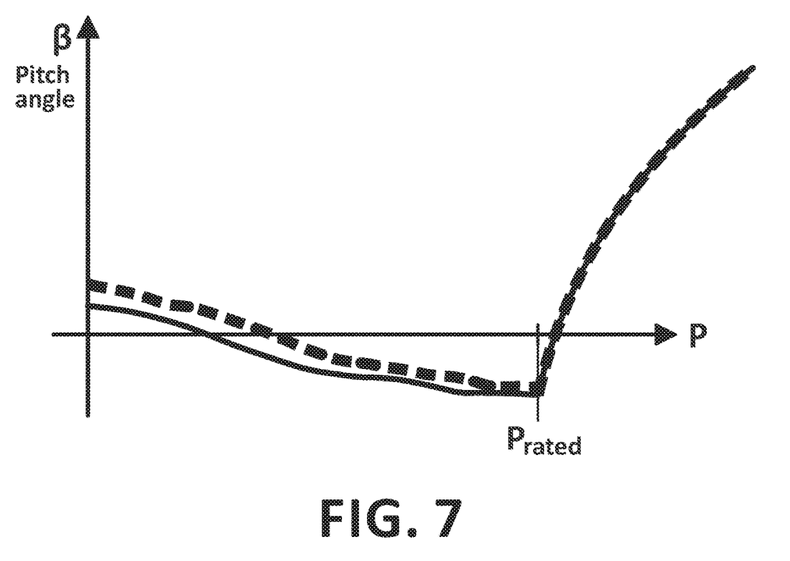
FIG. 7 shows the ratio between the blade pitch angle and the electric power generated before applying, in dashed line, and after applying, in solid line, the control method of a wind turbine of the present invention.

A modification of the ratio ($K_{opt}$) between the torque required to the wind turbine (T) and the square of the rotational speed of the wind turbine ($\omega^2$) in the variable speed area following the method described is indicative of a change in $C_p$ and therefore of the electric power produced for specific environmental conditions. The variation of the electrical power produced for certain conditions also affects the ratio between the pitch angle and the electric power generated, so that the pitch angle set by the control system would no longer be appropriate for the environmental conditions. That is why in order to try to compensate for this effect, the present invention applies a modification of the ratio between the pitch angle and the electric power generated proportional to that obtained for the ratio ($K_{opt}$) between the torque required to the wind turbine (T) and the square of the rotational speed of the wind turbine ($\omega^2$) in the variable speed area, since the cause of the deviation is the same for both parameters. FIG. 7 shows the ratio between the pitch angle and the generated electric power before and after modification.

Figure 8:
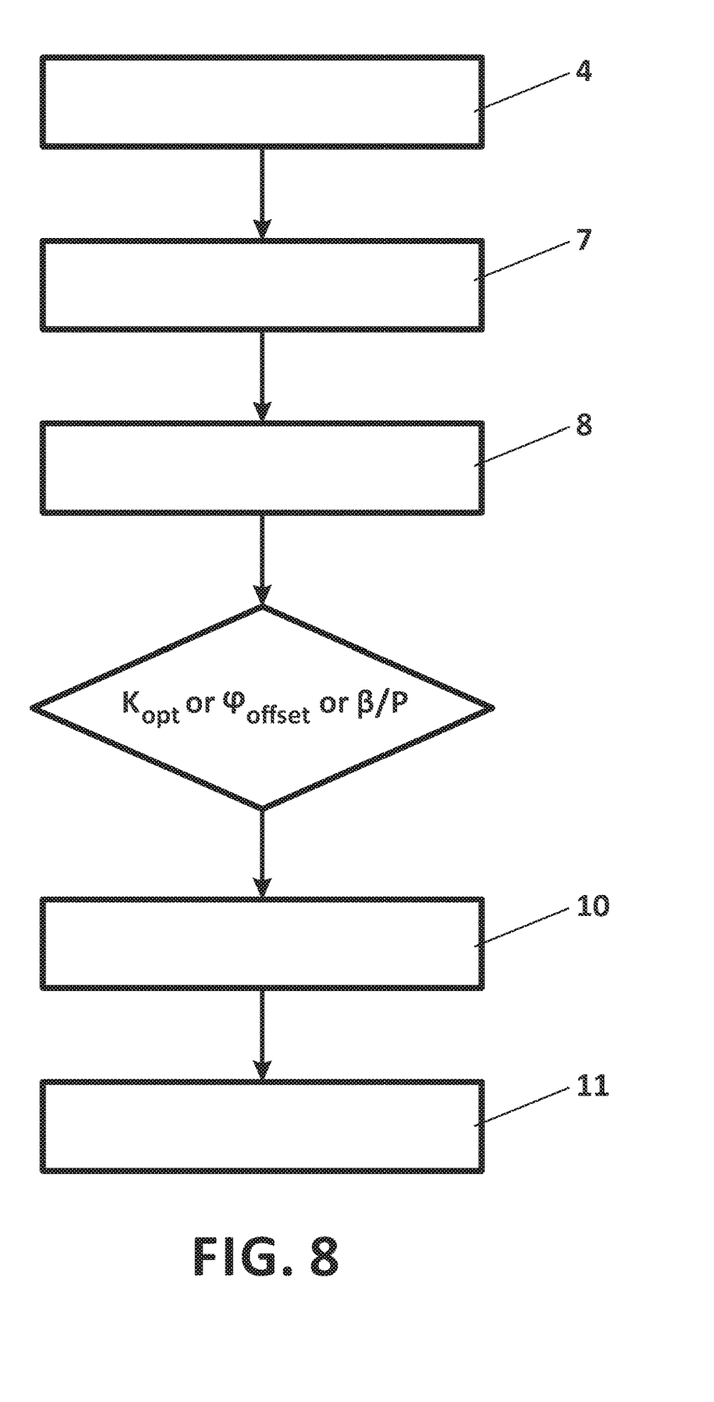
FIG. 8 shows a flowchart of the step of modifying at least one parameter of the control system.

Alternatively, if it is not possible to rule out that the difference of the mean value ($\lambda_{med}$) of the parameter indicative of the tip speed ratio in the variable speed area with respect to the target value ($\lambda_{opt}$) of the parameter indicative of the tip speed ratio in that area of operation is due to an error in the orientation of the nacelle of the wind turbine, the modification step (4) of at least one parameter of the control system further comprises a sub step of identification (7) of at least one control parameter to be modified, where the unsuitable parameter is identified, as shown in the flowchart of FIG. 8.

This sub step of identification (7) of at least one control parameter to be changed in turn comprises a sub step of comparing (8) at least one wind turbine operational parameter related to at least one control parameter, with a the same operational parameter of at least one adjacent wind turbine.

Preferably, the operational parameter is one of the following:
- the mean value ($\lambda_{med}$) of a parameter indicative of the tip speed ratio, wherein the parameter indicative of the tip speed ratio may be the same as that used in the step of comparison with the target value ($\lambda_{opt}$) of the parameter indicative of the tip speed ratio, or some other,
- the nacelle orientation,
- a signal indicative of the efficiency of the wind turbine, which may be the power coefficient ($C_p$) in the variable speed area.

If the operational parameter to be compared between two wind turbines is the nacelle orientation, the sub step of comparing (8) at least one operational parameter of the wind turbine related to at least one control parameter, with the same operational parameter of at least one adjacent wind turbine comprises:
- calculating a difference between the nacelle orientation of the wind turbine and the nacelle orientation of an adjacent wind turbine, and
- comparing the difference between the nacelle orientation of the wind turbine with the nacelle orientation of the adjacent wind turbine with a second threshold value.

In a preferred embodiment, the sub step of comparing (8) at least one operational parameter of the wind turbine with the same operational parameter of at least one adjacent wind turbine comprises the following steps:
- The at least two wind turbines whose operational parameters are to be compared, send to the wind farm control system the values of the operational parameters,
- The wind farm control performs comparisons of operational parameters and identifies the machine and the at least one control parameter to be modified,
- The wind farm control system sends to the control system of the machines indications about whether to change any parameter of the control system and which one.

In an alternative embodiment, the sub-step of comparing (8) at least one operational parameter of the wind turbine with the same operational parameter of at least one adjacent wind turbine comprises the following steps:
- The at least one adjacent wind turbine sends to the wind farm control system the values of the operational parameters,
- The wind farm control system sends the values of operational parameters of the at least one adjacent wind turbine to the wind turbine whose control system is executing the sub step of identification (7) of at least one control parameter to be modified,
- The control system of the wind turbine whose control system is executing the sub step of identification (7) of at least one control parameter to be modified makes comparisons of operational parameters and identifies the parameter to be modified first in the step of modification (4) of at least one parameter of the control system.

If when carrying out a comparison of the difference between the nacelle orientation of the wind turbine and the nacelle orientation of the adjacent wind turbine and the second threshold value, said difference is below the second threshold value, in the sub-step of identification (7) of at least one control parameter to be modified it is identified that the parameter to be modified in the step of modification (4) of at least one control system parameter is at least the ratio ($K_{opt}$) between the torque required to the turbine (T) and the square of the rotational speed of the wind turbine ($\omega^2$) in the variable speed area.

On the contrary, if the difference between the nacelle orientation of the wind turbine and the nacelle orientation of the adjacent wind turbine is above the second threshold value, the sub-step of comparison (8) of at least one operational parameter of the wind turbine related to at least one control parameter, with the same operational parameter of at least one adjacent wind turbine further comprises:

calculating a difference between a signal indicative of the efficiency of the wind turbine and a signal indicative of the efficiency of an adjacent wind turbine, or calculating a difference between the mean value ($\lambda_{med}$) of a parameter indicative of the tip speed ratio of the wind turbine and the mean value ($\lambda_{med}$) of a parameter indicative of the tip speed ratio of the adjacent wind turbine, wherein if the difference between the signal indicative of the efficiency of the wind turbine with the signal indicative of the efficiency of an adjacent wind turbine is above a third threshold value or the difference between the mean value ($\lambda_{med}$) of the parameter indicative of the tip speed ratio of the wind turbine with the mean value ($\lambda_{med}$) of the parameter indicative of the tip speed ratio of the adjacent wind turbine is above a fourth threshold value, in the sub step of identification (7) of at least one control parameter to be modified it is identified that the parameter to be modified in the step of modification (4) of at least one parameter of the control system is at least an offset of nacelle orientation which has the lowest value of the signal indicative of the efficiency of the wind turbine or the lower value of the mean value ($\lambda_{med}$) of the parameter indicative of tip speed ratio.

The parameter indicative of the tip speed ratio employed in this step may be the same as that used in the step of comparison with the target value ($\lambda_{opt}$) of the parameter indicative of the tip speed ratio, or some other, Alternatively, the sub-step of comparison (8) of at least one operational parameter of the wind turbine related to at least one control parameter, with the same operational parameter of at least one adjacent wind turbine comprises:

calculating a difference between a signal indicative of the efficiency of the wind turbine and a signal indicative of the efficiency of an adjacent wind turbine, or calculating a difference between the mean value ($\lambda_{med}$) of a parameter indicative of the tip speed ratio of the wind turbine and the mean value ($\lambda_{med}$) of a parameter indicative of the tip speed ratio of the adjacent wind turbine, wherein if the difference between the signal indicative of the efficiency of the wind turbine with the signal indicative of the efficiency of an adjacent wind turbine is below a third threshold value or the difference between the mean value ($\lambda_{med}$) of the parameter indicative of the tip speed ratio of the wind turbine with the mean value ($\lambda_{med}$) of the parameter indicative of the tip speed ratio of the adjacent wind turbine is below a fourth threshold value, in the sub-step of identification (7) of at least one control parameter to be modified it is identified that the parameter to be changed first in the step of modification (4) of at least one parameter of the control system is the ratio ($K_{opt}$) between the torque required to the generator (T) and the square of the rotational speed of the generator ($\omega^2$) in the variable speed area.

In the latter case, the method detects that there is an unsuitable control parameter and by comparison with an adjacent turbine, it is noted that the situation equally affects both wind turbines, so it is associated with causes such as variation in the air density, dirt or ice on the blades, etc. . . . as these causes would similarly affect adjacent wind turbines. All these causes produce deviations of $\lambda$ with respect to $\lambda_{opt}$ which are corrected by changing the ratio ($K_{opt}$) between the torque required to the generator (T) and the square of the rotational speed of the generator ($\omega^2$) in the variable speed area.

If the control system determines that the wind turbine is not working at its optimum operating point, i.e., it is not capturing as much energy as possible given the existing environment and wind turbine conditions and the control parameter to be modified to correct this situation has been identified, the control method comprises a step of automatic identification (10) of the correct value of the control parameter to be changed, comprising the following sub steps:

a sub step of operation (12) of the wind turbine alternating periods of similar duration in which the control parameter takes different values and in which registration is performed, for each of the periods, of wind speed data and operational parameters of the wind turbine, and     a sub-step of selection (13) of the value of the control parameter to be changed considering the wind speed data and operational parameters of the wind turbine.

The new selected value of the control parameter to be modified is the one that provides the highest efficiency of the wind turbine or the most suitable value indicative of loads in the wind turbine.

In the sub step of operation (12) modes of operation are defined in which the control parameter takes a value for each operating mode. These operating modes alternate sequentially during periods of similar duration until sufficient information is available for each period.

For a first embodiment, the step of automatic identification (10) of the correct value of the control parameter to be modified further comprises:

a sub-step of calculating a difference (14) between the mean value ($\lambda_{med}$) of a parameter indicative of the tip speed ratio in the variable speed area and the target value ($\lambda_{opt}$) of the parameter indicative of the tip speed ratio in the periods in which the control parameter takes each of the different values, and wherein the step of automatic identification (10) of the correct value of the control parameter to be modified is repeated until at least one difference between the mean value ($\lambda_{med}$) of the parameter indicative of the tip speed ratio in the variable speed area and the target value ($\lambda_{opt}$) of the parameter indicative of the tip speed ratio in the periods in which the control parameter takes each of the different values, is below a fifth threshold value, and wherein in each step of automatic identification (10) of the correct value of the control parameter to be modified, at least part of the values taken by the control parameter are different from those of the previous step of automatic identification (10) of the correct value of the control parameter to be modified.

In this embodiment, the parameter indicative of the tip speed ratio is the same as that used in the initial step of comparison with the target value ($\lambda_{opt}$) of the parameter indicative of the tip speed ratio, although it could be a different one, For a second embodiment, in the sub step of operation (12) of the wind turbine alternating periods of similar duration in which the control parameter takes different values, and in which registration is performed, for each of the periods, of wind speed data and operational parameters of the wind turbine of the step of automatic identification (10) of the correct value of the control parameter to be changed, the control parameter takes at least three values, and the step of automatic identification (10) of the correct value of the control parameter to be modified further comprises:
- a sub-step of calculating an indicative value (15) of the efficiency of the wind turbine or of a value indicative of loads on the wind turbine during periods in which the control parameter takes each of the different values,
- wherein the step of automatic identification (10) of the correct value of the control parameter to be modified is repeated until the value of the control parameter that provides the largest value indicative of the efficiency of the wind turbine or a pre-set value indicative of the wind turbine loads, it is one of the central values of the control parameter, i.e., is not one of the two extreme values of the at least three values taken by the control parameter, and
- wherein in each step of automatic identification (10) of the correct value of the control parameter to be modified at least part of the values taken by the control parameter are different from those of the previous step of automatic identification (10) of the correct value of the control parameter to be changed, the value of the control parameter which provides the higher indicative value of wind turbine efficiency or the pre-set value indicative of loads on the wind turbine in the repetition of the step of automatic identification (10), being one of the central values of the control parameter values in the new repetition of the step of automatic identification (10) of the correct value of the control parameter to be modified, In the second embodiment, in the step of automatic identification of a new value of the control parameter to be changed, the control parameter preferably takes three values.

When the value of the control parameter that provides the higher value indicative of the efficiency of the wind turbine or the pre-set value indicative of loads in the wind turbine is one of the central values of the control parameter, the step of automatic identification (10) of the correct value of the control parameter to be modified further comprises:
- a sub-step of calculating the mean value ($\lambda_{med}$) of the parameter indicative of the tip speed ratio (16) in the variable speed area in periods in which the control parameter takes the value of the control parameter which provides the highest value indicative of the efficiency of the wind turbine or a pre-set value indicative of loads on the wind turbine, and
- a sub-step of allocation (17) to the target value ($\lambda_{opt}$) of the parameter indicative of the tip speed ratio the mean value ($\lambda_{med}$) parameter indicative of the tip speed in the variable speed area in periods in which the control parameter takes the value of the control parameter that provides the highest value indicative of the efficiency of the wind turbine or a pre-set value indicative of the wind turbine loads.

In a third embodiment, the step of automatically identifying (10) the correct value of the control parameter to be modified comprises a sub step of analytical calculation (18) of the new value of the control parameter that is conducted from the mean value ($\lambda_{med}$) of a parameter indicative of the tip speed ratio, $\lambda$, in the variable speed area or from a value indicative of the efficiency of the wind turbine or a value indicative of loads on the turbine.

When the control parameter to be modified is the ratio ($K_{opt}$) between the torque required to the wind turbine (T) and the square of the rotational speed of the wind turbine ($\omega^2$) in the variable speed area, the analytical calculation of the new value $K_{opt}$ ($K_{opt\_nuevo}$) is performed based on the previous value of $K_{opt}$ ($K_{opt\_anterior}$) according to the following expression:

$$K_{opt_{nuevo}} = K_{opt_{anterior}} \cdot \left(\frac{\lambda_{med}}{\lambda_{opt}}\right)^3$$

In a fourth embodiment, the step of automatic identification (10) of the correct value of the control parameter to be modified comprises a control loop which monitors the mean value ($\lambda_{med}$) of a parameter indicative of the tip speed ratio in a variable speed area and regulates the control parameter based on the difference between the mean value ($\lambda_{med}$) of the parameter indicative of the tip speed ratio in the variable speed area and the target value ($\lambda_{opt}$) of the parameter indicative of the tip speed ratio.

Figure 9:
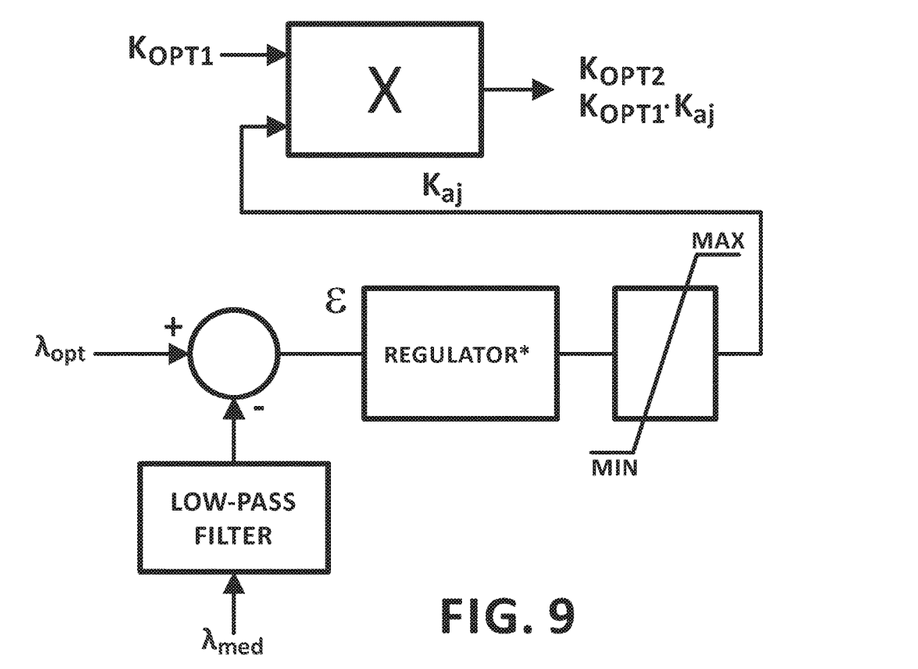
FIG. 9 shows a block diagram of a controller used for calculating the new value of the ratio ($K_{opt}$) between the torque required to the turbine (T) and the square of the rotational speed of the wind turbine ($\omega^2$) in the variable speed area.

FIG. 9 shows a control loop for the case where the control parameter to be modified is the ratio ($K_{opt}$) between the torque required to the turbine (T) and the square of the rotational speed of the wind turbine ($\omega^2$) in the variable speed area.

After the step of automatic identification (10) of the correct value of the control parameter to be changed, the control method further comprises a step of updating (11) the control parameter to the value selected in the stage of automatic identification.

Figure 10:
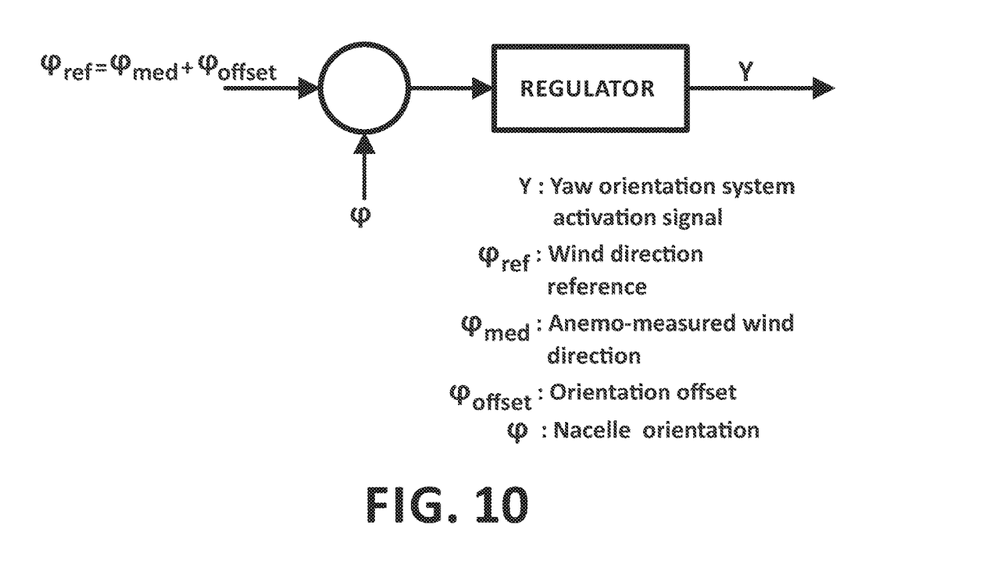
FIG. 10 shows a block diagram of a controller used for controlling the nacelle orientation.

FIG. 10 shows a block diagram of a controller used for controlling the nacelle orientation.

The invention also relates to the control system of a wind turbine comprising a wind turbine control method as detailed above and a wind turbine comprising such a control system.

Figure 11:
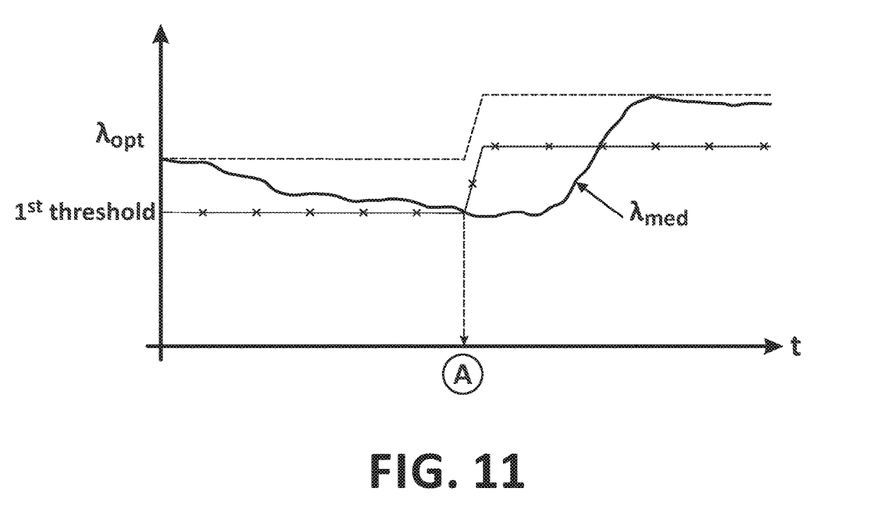
FIG. 11 shows a graph of the time evolution of the mean value ($\Delta_{med}$) of the parameter indicative of the tip speed ratio in the variable speed area in a wind turbine when the target value ($\lambda_{opt}$) of the parameter indicative of the tip speed ratio is modified.

FIG. 11 shows a graph of the time evolution of the mean value ($\lambda_{med}$) of the parameter indicative of the tip speed ratio in the variable speed area in a wind turbine when the target value ($\lambda_{opt}$) of the parameter indicative of the tip speed ratio is modified.

Due to environmental conditions or conditions of the turbine itself that modify the aerodynamic characteristics of the wind turbine, its point of maximum performance can be changed. In these conditions, the target value ($\lambda_{opt}$) of the parameter indicative of the tip speed ratio no longer corresponds to the value of the parameter indicative of the tip speed ratio that provides the highest generation of electrical energy in the variable speed area. When these conditions are detected, based on the result of the step of comparison between the mean value ($\lambda_{med}$) of the parameter indicative of the tip speed ratio in the variable speed area and the target value ($\lambda_{opt}$) of the parameter indicative of the tip speed ratio, the control system of the invention further comprises a step of modification of the target value ($\lambda_{opt}$) of the parameter indicative of the tip speed ratio.

Figure 12:
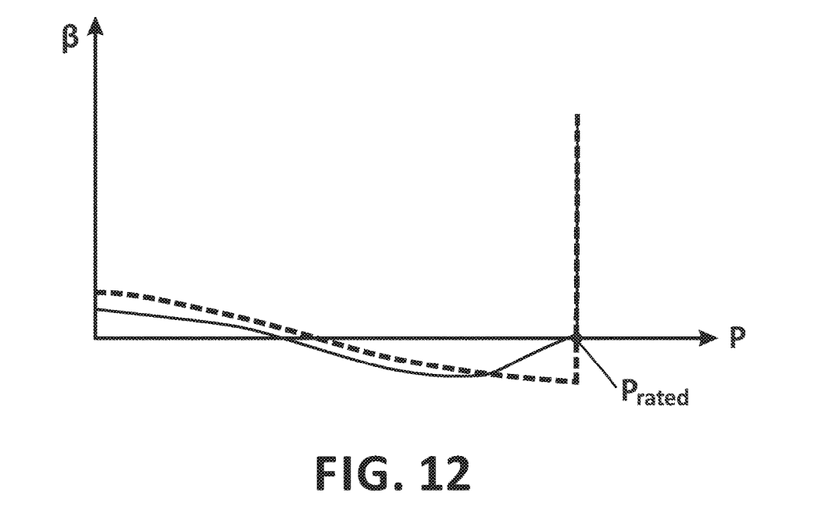
FIG. 12 shows the ratio between the blade pitch angle and the electric power generated before applying, in dashed line, and after applying, in solid line, the increase of the ratio between the pitch angle and the electrical power generated in the area where the wind turbine is operating at $\omega_{rated}$ and below $P_{rated}$.

FIG. 12 shows the ratio between the blade pitch angle and the electric power generated before applying, in dashed line, and after applying, in solid line, the increase of the ratio between the pitch angle and the electrical power generated in the area where the wind turbine is operating at $\omega_{rated}$ and below $P_{rated}$.

When the control parameter modified is the ratio ($K_{opt}$) between the torque required to the wind turbine (T) and the square of the rotational speed of the wind turbine ($\omega^2$) in the variable speed area, the range of wind speeds in which the wind turbine is operating at $\omega_{rated}$ and below $P_{rated}$ is extended. As a consequence, in this operating area the angles of attack of the aerodynamic profiles of the blade increase which in turn can cause stall and therefore loss of energy production and higher loads.

To prevent this situation, the control system of the of the invention, can additionally increase the ratio between the pitch angle and the electrical power generated in the area where the wind turbine is operating at a rated value of the rotational speed $\omega_{rated}$ and below a rated value of the electrical power $P_{rated}$ rated based on the result of the step of comparison between the mean value ($\lambda_{med}$) of the parameter indicative of the tip speed ratio in the variable speed area and the target value ($\lambda_{opt}$) of the parameter indicative of the tip speed ratio.

The invention claimed is:

1. A control method for a wind turbine, said turbine comprising:
    a rotor with a substantially horizontal axis and with at least one blade,
    a nacelle with an anemometer, and
    a control system, and
    the control method comprises:
    a step of calculating a mean value ($\lambda_{med}$) of a parameter indicative of the tip speed ratio, $\lambda$, in the variable speed area, based on a signal of the rotational speed of the rotor, $\omega$ and a signal of the wind speed, v,
    a step of comparing, the mean value ($\lambda_{med}$) of the parameter indicative of the tip speed ratio in the variable speed area with a target value ($\lambda_{opt}$) of the parameter indicative of the tip speed ratio,
    a step of modification of at least one parameter of the control system based on the result of the step of comparison between the mean value ($\lambda_{med}$) of the parameter indicative of the tip speed ratio in the variable speed area and the target value ($\lambda_{opt}$) of the parameter indicative of the tip speed ratio, and
    a step of controlling the rotational speed of the rotor ($\omega$) within an variable speed area comprised between a preset minimum value ($\omega_{min}$) and a preset maximum value ($\omega_{max}$) of rotational speed of the rotor ($\omega$) so that a tip speed ratio, $\lambda$, is maintained substantially equal to a target value ($\lambda_{opt}$) of the tip speed ratio,
    wherein the control parameter to be modified in the modification step is at least one of the following:
    a ratio ($K_{opt}$) between the torque required to the wind turbine (T) and the square of the rotational speed of the wind turbine ($\omega^2$) in the variable speed area
    an offset of nacelle orientation.

2. The control method for a wind turbine of claim 1, wherein the target value ($\lambda_{opt}$) of the parameter indicative of the tip speed ratio corresponds to the value of the parameter indicative of the tip speed ratio that corresponds to a point of maximum performance of the wind turbine where the highest generation of electrical energy in the variable speed area is achieved.

3. The control method for a wind turbine of claim 1, wherein the step of comparison of the mean value ($\lambda_{med}$) of the parameter indicative of the tip speed ratio in the variable speed area with the target value ($\lambda_{opt}$) of the parameter indicative of the tip speed ratio comprises a sub step of calculation of a difference between the mean value ($\lambda_{med}$) of the parameter indicative of the tip speed ratio in the variable speed area and the target value ($\lambda_{opt}$) of the parameter indicative of the tip speed ratio, and wherein the step of modifying at least one parameter of the control system is performed if the value of the calculated difference between the mean value ($\lambda_{med}$) of the parameter indicative of the tip speed ratio in the variable speed area and the target value ($\lambda_{opt}$) of the parameter indicative of the tip speed ratio is above a first threshold value.

4. The control method for a wind turbine of claim 1, wherein it comprises a step of filtering the values of the parameter indicative of the tip speed ratio, $\lambda$, prior to the step of calculating the mean value ($\lambda_{med}$) of the parameter indicative of the tip speed ratio in the variable speed area.

5. The control method for a wind turbine of claim 1, wherein the step of calculating the mean value ($\lambda_{med}$) of the parameter indicative of the tip speed ratio, $\lambda$, in the variable speed area, is performed with values of the parameter indicative of the tip speed ratio corresponding to rotational speeds of the rotor ($\omega$) greater than 1.1 times the preset minimum rotational speed ($\omega_{med}$) of the variable speed area of the rotor and less than 0.9 times the preset maximum rotational speed ($\omega_{max}$) of the variable speed area of the rotor.

6. The control method for a wind turbine of claim 1, wherein the parameter indicative of the tip speed ratio is calculated based on a signal of the rotational speed of the rotor, $\omega$, and a signal of the wind speed, v, according to the formula $\lambda=(\omega \times R)/v$, wherein R is the rotor radius.

7. The control method for a wind turbine of claim 1, wherein when the control parameter to be modified is the ratio ($K_{opt}$) between the torque required to the wind turbine (T) and the square of the rotational speed of the wind turbine ($\omega^2$) in the variable speed area, the ratio between the pitch angle and the electrical power generated is modified proportionally to the ratio ($K_{opt}$) between the torque required to the wind turbine (T) and the square of the rotational speed of the wind turbine ($\omega^2$) in the variable speed area.

8. The control method for a wind turbine of claim 1, wherein the step of modification of at least one parameter of the control system further comprises a sub step of identification of at least one control parameter to be modified.

9. The control method for a wind turbine of claim 8, wherein in that the sub step of identification of at least one control parameter to be changed in turn comprises:
    a sub-step of comparison of at least one wind turbine operational parameter related to at least one control parameter, with a same operational parameter of at least an adjacent wind turbine.

10. The control method for a wind turbine of claim 9, wherein the operational parameter is one of the following:
    the mean value ($\lambda_{med}$) of a parameter indicative of the tip speed ratio,
    the nacelle orientation,
    a signal indicative of a efficiency of the turbine.

11. The control method for a wind turbine of claim 10, wherein the sub step of comparing at least one operational parameter of a wind turbine related to at least one control parameter, with the same operational parameter of at least one adjacent wind turbine comprises:
    calculating a difference between the nacelle orientation of the wind turbine and the nacelle orientation of an adjacent wind turbine, and
    comparing the difference between the nacelle orientation of the wind turbine with the nacelle orientation of the adjacent wind turbine with a second threshold value.

12. The control method for a wind turbine of claim 11, wherein if the difference between the nacelle orientation of the wind turbine and the nacelle orientation of the adjacent wind turbine is below the second threshold value, in the sub-step of identification of at least one control parameter to be modified it is identified that the parameter to be modified in the step of modification (4) of at least one control system parameter is at least one ratio ($K_{opt}$) between the torque required to the wind turbine (T) and the square of the rotational speed of the wind turbine ($\omega^2$) in the variable speed area.

13. The control method for a wind turbine of claim 11, wherein if the difference between the nacelle orientation of the wind turbine and the nacelle orientation of the adjacent wind turbine is above the second threshold value, the sub-step of comparison of at least one operational parameter of the wind turbine related to at least one control parameter, with the same operational parameter of at least one adjacent wind turbine further comprises:
   calculating a difference between the signal indicative of the efficiency of the wind turbine and a signal indicative of the efficiency of an adjacent wind turbine, or calculating a difference between the mean value ($\lambda_{med}$) of a parameter indicative of the tip speed ratio of the wind turbine and the mean value ($\lambda_{med}$) of a parameter indicative of the tip speed ratio of the adjacent wind turbine,
   wherein, if the difference between the signal indicative of the efficiency of the wind turbine and the signal indicative of the efficiency of an adjacent wind turbine is above a third threshold value or the difference between the mean value ($\lambda_{med}$) of the parameter indicative of the tip speed ratio and the mean value ($\lambda_{med}$) of the parameter indicative of the tip speed ratio of the adjacent turbine is above a fourth threshold value, in the sub step of identification of at least one control parameter to be modified it is identified that the parameter to be modified in the step of modification of at least one parameter of the control system is at least an offset of the nacelle orientation which has the lower value of the signal indicative of the efficiency of the wind turbine or the lower value of the mean value ($\lambda_{med}$) of the parameter indicative of tip speed ratio.

14. The control method for a wind turbine of claim 10, wherein the sub step of comparing at least one operational parameter of the wind turbine related to at least one control parameter, with the same operational parameter of at least one adjacent wind turbine comprises:
   calculating a difference between the signal indicative of the efficiency of the wind turbine and a signal indicative of the efficiency of an adjacent wind turbine, or calculating a difference between the mean value ($\lambda_{med}$) of a parameter indicative of the tip speed ratio of the wind turbine and the mean value ($\lambda_{med}$) of a parameter indicative of the tip speed ratio of the adjacent wind turbine,
   wherein if the difference between the signal indicative of the efficiency of the wind turbine and the signal indicative of the efficiency of an adjacent wind turbine is below a third threshold value or the difference between the mean value ($\lambda_{med}$) of the parameter indicative of the tip speed ratio of the wind generator and the mean value ($\lambda_{med}$) of the parameter indicative of the tip speed ratio of the adjacent wind turbine is below a fourth threshold value, in sub-step of identification of at least one control parameter to be modified it is identified that the parameter to be changed first in the step of modification of at least one parameter of the control system is a ratio ($K_{opt}$) between the torque required to the generator (T) and the square of the rotational speed of the generator ($\omega^2$) in the variable speed area.

15. The control method for a wind turbine of claim 1, wherein it further comprises a stage of automatic identification of the correct value of the control parameter to be modified.

16. The control method for a wind turbine of claim 15, wherein the stage of automatic identification of the correct value of the control parameter to be changed in turn comprises:
   a sub step of operation of the wind turbine alternating periods in which the control parameter takes different values and in which registration is performed, for each of the periods, of wind speed data and operational parameters of the wind turbine, and
   a sub-step of selection of the control parameter value to be modified based on the data of wind speed and wind turbine operating parameters registered with each of the values of the control parameter to be modified.

17. The control method for a wind turbine of claim 16, wherein the stage of automatic identification of the correct value of the control parameter to be modified further comprises:
   a sub-step of calculating a difference between the mean value ($\lambda_{med}$) of a parameter indicative of the tip speed ratio in the variable speed area and the target value ($\lambda_{opt}$) of the parameter indicative of the tip speed ratio in the periods in which the control parameter takes each of the different values, and
   wherein the step of automatic identification of the correct value of the control parameter to be modified is repeated until at least one difference between the mean value ($\lambda_{med}$) of the parameter indicative of the tip speed ratio in the variable speed area and the target value ($\lambda_{opt}$) of the parameter indicative of the tip speed ratio in the periods in which the control parameter takes each of the different values is below a fifth threshold value, and
   wherein in each step of automatic identification of the correct value of the control parameter to be modified at least part of the values taken by the control parameter are different from those of the previous stage of automatic identification of the correct value of the control parameter to be modified.

18. The control method for a wind turbine of claim 16, wherein in the sub step of operation of the wind turbine alternating periods of similar duration in which the control parameter takes different values, and in which registration of wind speed data and operational parameters of the wind turbine is performed for each of the periods, the control parameter takes at least three values, and in that the step of automatic identification of the correct value of the control parameter to be modified further comprises:
   a sub-step of calculating an value indicative of the efficiency of the wind turbine or of a value indicative of loads on the wind turbine during the periods in which the control parameter takes each of the different values,
   wherein the step of automatic identification of the correct value of the control parameter to be modified is repeated until the value of the control parameter that provides the highest value indicative of the efficiency of the wind turbine or a pre-set value indicative of the wind turbine loads, is one of the central values of the control parameter, and
   wherein in each step of automatic identification of the correct value of the control parameter to be modified at least part of the values taken by the control parameter are different from those of the previous step of automatic identification of the correct value of the control parameter to be modified, the value of the control parameter which provides the higher value indicative of turbine efficiency or the pre-set value indicative of loads on the wind turbine in the repetition of the previous step of automatic identification, being one of central values of the control parameter values in the new repetition of the step of automatic identification of the correct value of the control parameter to be modified.

19. The control method for a wind turbine of claim 18, wherein when the value of the control parameter that provides the highest value indicative of the efficiency of the wind turbine or the pre-set value indicative of loads in the wind turbine is one of the central values of the control parameter, the step of automatic identification of the correct value of the control parameter to be modified further comprises:
   a sub-step of calculating the mean value ($\lambda_{med}$) of a parameter indicative of the tip speed ratio in the variable speed area in periods in which the control parameter takes the value of the control parameter which provides the highest value indicative of the efficiency of the wind turbine or a pre-set value indicative of the wind turbine loads, and
   a sub-step of allocation to the target value ($\lambda_{opt}$) of the parameter indicative of the tip speed ratio of the mean value ($\lambda_{med}$) of the parameter indicative of the tip speed ratio in the variable speed area in the periods in which the control parameter takes the value of the control parameter that provides the highest value indicative of the efficiency of the wind turbine or a pre-set value indicative of the wind turbine loads.

20. The control method for a wind turbine of claim 15, wherein the step of automatic identification of the correct value of the control parameter to be modified comprises a sub step of analytical calculation of the new value of the control parameter.

21. The control method for a wind turbine of claim 20, wherein the sub step of analytical calculation of the new value of the control parameter is conducted based on the mean value ($\lambda_{med}$) of a parameter indicative of the tip speed ratio, $\lambda$, in the variable speed area.

22. The control method for a wind turbine of claim 20, wherein the sub step of analytical calculation of the new value of the control parameter is carried out based on a value indicative of the efficiency of the wind turbine or on a value indicative of loads on the wind turbine.

23. The control method for a wind turbine of claim 15, wherein the step of automatic identification of the correct value of the control parameter to be modified comprises a control loop which monitors the mean value ($\lambda_{med}$) of a parameter indicative the tip speed ratio in the variable speed area and regulates the control parameter based on the difference between the mean value ($\lambda_{med}$) of the parameter indicative of the tip speed ratio in the variable speed area and the target value ($\lambda_{opt}$) of the parameter indicative of the tip speed ratio.

24. The control method for a wind turbine of claim 15, wherein it further comprises a step of updating of the control parameter to the value selected in the step of automatic identification of the correct value of the control parameter to be modified.

25. The control method for a wind turbine of claim 1, wherein, it further comprises a step of modification of the target value ($\lambda_{opt}$) of the parameter indicative of the tip speed ratio based on the result of the step of comparison between the mean value ($\lambda_{med}$) of the parameter indicative of the tip speed ratio in the variable speed area and the target value ($\lambda_{opt}$) of the parameter indicative of the tip speed ratio.

26. The control method for a wind turbine of claim 1, wherein a ratio between a pitch angle and electrical power generated in an area where the wind turbine is operating at a rated value of a rotational speed $\omega_{rated}$ and below a rated value of electrical power $P_{rated}$ is increased based on the result of the step of comparison between the means value ($\lambda_{med}$) of the parameter indicative of the tip speed ratio in the variable speed area and the target value ($\lambda_{opt}$) of the parameter indicative of the tip speed ratio.

27. The control method for a wind turbine of claim 1, wherein the control parameter to be modified in the modification step is in addition a ratio between the pitch angle and the electric power generated.

28. A control system for a wind turbine, said turbine comprising:
   a rotor with a substantially horizontal axis and with at least one blade,
   a nacelle with an anemometer, and
   a wind turbine control method that comprises:
      a step of calculating a mean value ($\lambda_{med}$) of a parameter indicative of the tip speed ratio, $\lambda$, in the variable speed area, based on a signal of the rotational speed of the rotor, $\omega$ and a signal of the wind speed, v,
      a step of comparing the mean value ($\lambda_{med}$) of the parameter indicative of the tip speed ratio in the variable speed area with a target value ($\lambda_{opt}$) of the parameter indicative of the speed ratio, and
      a step of modification of at least one parameter of the control system based on the result of the step of comparison between the mean value ($\lambda_{med}$) of the parameter indicative of the tip speed ratio in the variable speed area and the target value ($\lambda_{opt}$) of the parameter indicative of the tip speed ratio, and
      a step of controlling the rotational speed of the rotor ($\omega$) within an variable speed area comprised between a preset minimum value ($\omega_{min}$) and a preset maximum value ($\omega_{max}$) of rotational speed of the rotor ($\omega$) so that a tip speed ratio, $\lambda$, is maintained substantially equal to a target value ($\lambda_{opt}$) of the tip speed ratio,
      wherein the control parameter to be modified in the modification step is at least one of the following:
         a ratio ($K_{opt}$) between the torque required to the wind turbine (T) and the square of the rotational speed of the wind turbine ($\omega^2$) in the variable speed area,
         an offset of nacelle orientation.

29. A wind turbine comprising:
   a rotor with a substantially horizontal axis and with at least one blade,
   a nacelle with an anemometer, and
   a control system, and
   the control system further comprises:
      a step of calculating a mean value ($\lambda_{med}$) of a parameter indicative of the tip speed ratio, $\lambda$, in the variable speed area, based on a signal of the rotational speed of the rotor, $\omega$ and a signal of the wind speed, v,
      a step of comparing the mean value of the parameter indicative of the tip speed ratio in the variable speed area with a target value ($\lambda_{opt}$) of the parameter indicative of the tip speed ratio
      a step of modification of at least one parameter of the control system based on the result of the step of comparison between the mean value ($\lambda_{med}$) of the parameter indicative of the tip speed ratio in the variable speed area and the target value ($\lambda_{opt}$) of the parameter indicative of the tip speed ratio, and a step of controlling the rotational speed of the rotor ($\omega$) within an variable speed area comprised between a preset minimum value ($\omega_{min}$) and a preset maximum value ($\omega_{max}$) of rotational speed of the rotor ($\omega$) so that a tip speed ratio, $\lambda$, is maintained substantially equal to a target value ($\lambda_{opt}$) of the tip Speed ratio, wherein the control parameter to be modified in the modification step is at least one of the following:

a ratio ($K_{opt}$) between the torque required to the wind turbine (T) and the square of the rotational speed of the wind turbine ($\omega^2$) in the variable speed area, an offset of nacelle orientation.

* * * * *